Oct. 12, 1943.  O. A. PAUTZ  2,331,566
ADJUSTABLE HANGER
Filed Feb. 14, 1942
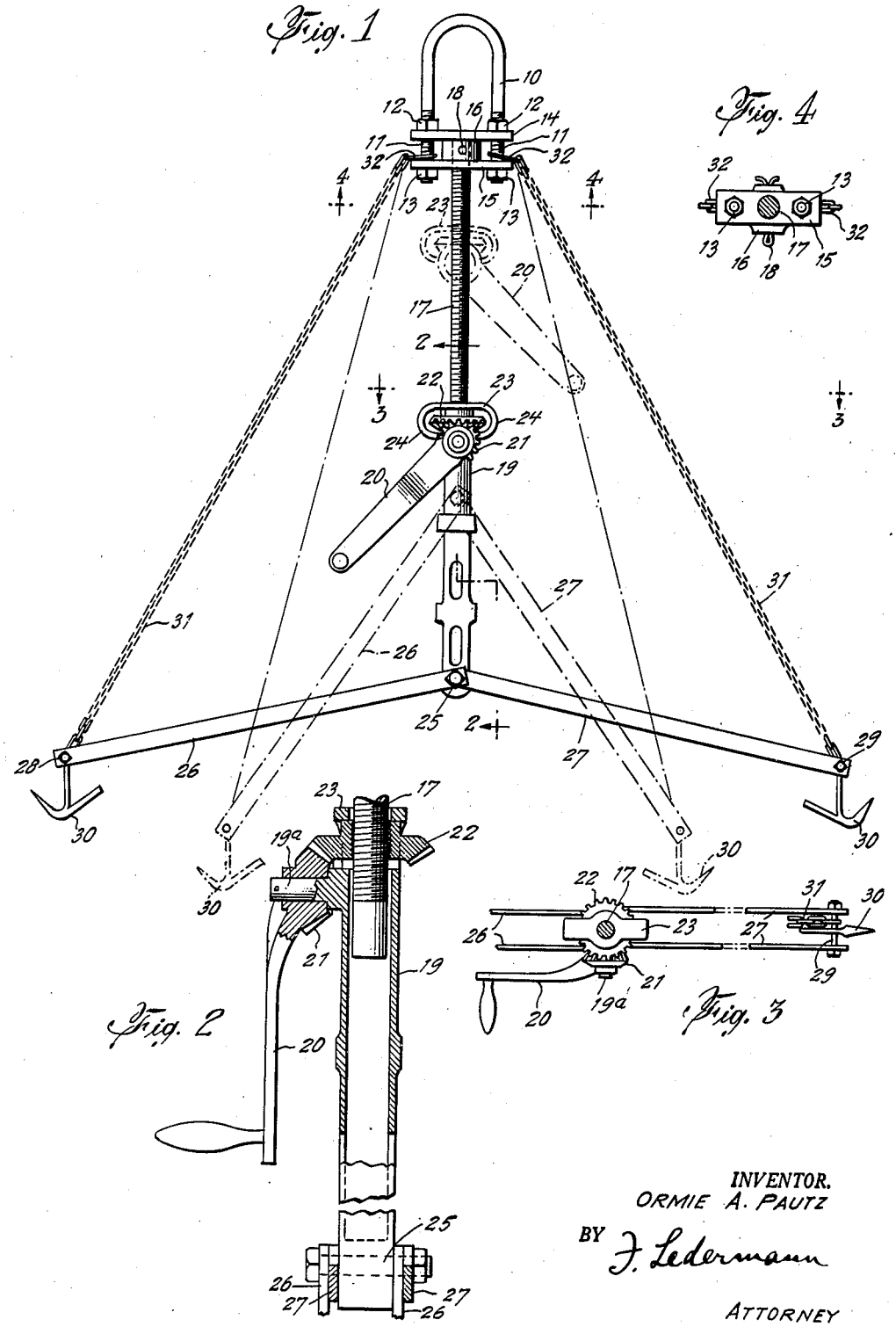
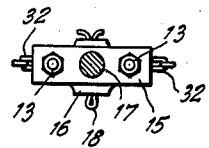
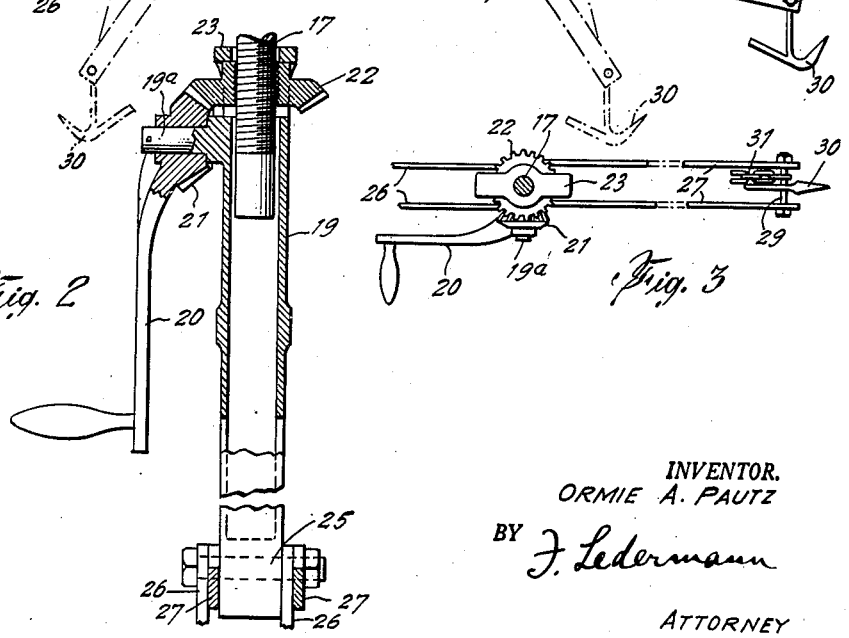
INVENTOR.
ORMIE A. PAUTZ
BY J. Ledermann
ATTORNEY Patented Oct. 12, 1943

2,331,566

UNITED STATES PATENT OFFICE 2,331,566

ADJUSTABLE HANGER

Ormie A. Pautz, Maribel, Wis.

Application February 14, 1942, Serial No. 430,940

7 Claims. (Cl. 294—79)

This invention relates to adjustable hangers, more particularly to gambrels or the like adapted to suspend slaughtered animals such as hogs in such position that they may be readily dressed, and the object of the invention is to provide certain useful improvements in such hangers whereby their operation and use are simplified and enhanced.

Another object of the invention is the provision of a simple and practical means for spreading the legs by which the carcass is suspended from the hanger, by means of which the legs are securely and firmly maintained in any of a range of positions between a minimum spread and a maximum provided by the device. This adjustable feature also readily accommodates the device for both large and small hogs or other animals. The device may also be used as a bag holder hung on the granary wall and be adjustable to wide or narrow bags, and has other uses also.

The above and other objects will become apparent in the description below, in which reference is had to the accompanying drawing, forming a part hereof.

Referring briefly to the drawing,

Figure 1 is a front elevational view of the device, showing the adjustable members thereof in solid lines in one position and in broken lines in another position.

Figure 2 is a cross-sectional view taken on the line 2—2 of Figure 1.

Figure 3 is a cross-sectional view taken on the line 3—3 of Figure 1, and Figure 4 is a similar view on the line 4—4.

Referring further and in greater detail to the drawing, the numeral 10 indicates a U-bolt which is adapted to be suspended from a hook, not shown, secured to a wall or the like in convenient position. The lower portions of the arms 11 of the bolt 10 are threaded to receive two pairs of nuts, 12 and 13. Between these pairs of nuts are a pair of identical spaced plates 14 and 15, and clamped between the plates is a larger nut 16. It is obvious that tightening of the nuts 12 and 13 against their respective plates 14 and 15, will firmly secure the nut 16 therebetween and prevent rotation of the latter.

A threaded vertical stem or screw 17 passes through the plate 15 and registers in the nut 16. It is apparent that, upon rotation of the screw 17 home into the nut 16, it will come to a dead stop against the plate 14, so that no further rotation of the screw will be possible. Thus, the screw is secured against rotation in one direction. However, to further assure that the screw will not rotate in either direction, a cotter pin 18 is passed through the nut 16 and the screw. Of course, any other means of maintaining the screw 17 non-rotatable with respect to the plates and bolt may equally well be used, and the means just described serves simply to illustrate one manner in which that purpose may be accomplished.

The lower end of the screw 17 registers loosely and slidably in a hollow sleeve 19 having a rigid pin 19a extending horizontally from the upper end thereof, and a crank 20 is rotatably mounted on this pin. A bevel pinion 21 is rigid with the base of the crank and is in mesh with a bevel gear 22, the latter being loosely rotatable on and in mesh with screw 17 and being vertically positioned between the top of the sleeve 19 and a spaced roof 23 supported by bulging side members 24 extending rigidly from the upper end of the sleeve 19. The screw 17 passes loosely through the roof 23.

A pin 25 extends through the lower end of the sleeve 19, and has pivotally secured thereto the ends of pairs of spaced arms or brackets 26 and 27. The extremities of the brackets 26 and 27 are joined by bolts or pins 28 and 29, respectively. Suspended pivotally from the pins 28 and 29, are hooks 30. Chains 31 having rings 32 on their upper ends embracing the U-bolt ends 11 and 11 between the plates 14 and 15, have their lower ends secured to the pins 28 and 29, and thus the outer ends of the brackets 26 and 27 are supported by the chains 31.

The operation of the device is as follows. Assuming that it is suspended by the bolt 10 from a hook on the wall, and that a small hog is to be hung therefrom, the crank 20 is rotated to raise the sleeve 19 to the position of the crank shown in broken lines in Figure 1, in which case the hooks 30 will both fall and come closer together to the positions shown in broken lines in the same figure. If it is then desired to spread the legs of the hung hog, the crank 20 is rotated in the opposite direction. In the case of large hogs, the crank is rotated to separate the hooks a sufficient distance prior to hanging the hog.

It is apparent that the spreading or bringing together of the hooks 30 is accomplished, with the present device, with a minimum of effort and without requiring any other movement than the rotation of the crank, and the latter operation is a simple one requiring very little expenditure of energy on the part of the operator.

Obviously, modifications in form and structure may be made without departing from the spirit and scope of the invention.

I claim:

1. An adjustable hanger comprising a member adapted to be suspended from a hook or the like, a vertical screw having its upper end anchored against rotation in said member, a sleeve having said worm registering loosely and slidably therein, said sleeve having a pin rigid thereon and having a bevel pinion rotatable on said pin, a crank rigid with said pinion and adapted to rotate the same, a bevel gear mounted on and in mesh with said screw and in mesh with said pinion, an extension on said sleeve maintaining said gear in fixed vertical relation therewith, divergent brackets having their inner extremities pivotally secured to the lower end of said sleeve and having hooks on their outer ends, and chains having their lower ends secured to said outer ends of said brackets and their upper ends to said member.

2. An adjustable hanger comprising a member adapted to be suspended from a hook or the like, a vertical screw suspended from and anchored against rotation in said member, a sleeve loosely surrounding said screw and having a bevel gear rotatably mounted therein, said gear meshing with said screw, means for rotating said gear, divergent brackets having their inner ends pivoted to said sleeve and having hooks on their outer ends, chains secured at one end to said member and at the other end to the outer extremities of said brackets.

3. An adjustable hanger comprising a member adapted to be suspended from a hook or the like, a pair of divergent brackets having hooks on their outer ends, chains secured to one end to said member and at the other end to the outer extremities of said brackets, a member having the inner ends of said brackets pivoted thereto, a vertical screw suspended from and anchored against rotation in said first member, and rotatable means partly on said second member and partly on said screw for raising or lowering said second member and simultaneously bringing together or spreading said outer extremities of said brackets.

4. An adjustable hanger adapted to be suspended from a hook or the like comprising an upper rigid member and a lower member mounted on and vertically movable on said rigid member, divergent brackets having their inner ends pivoted to said movable member and having hooks on their outer ends, chains or the like suspended from said rigid member and having their lower ends secured to the outer ends of said brackets, and rotatable means partly on said rigid member and partly on said movable member for raising or lowering said movable member on said rigid member and simultaneously bringing together or spreading the outer ends of said brackets.

5. An adjustable hanger comprising a member adapted to be suspended from a hook or the like, clamping means on said member having a nut or the like clamped therebetween, a screw having its upper end threaded into said nut, a sleeve loosely mounted on said screw, rotatable means partly on said sleeve and partly on said screw for moving said sleeve vertically on said screw, divergent brackets having their inner ends pivoted to said sleeve and having hooks on their outer ends, chains or the like suspended from said first-named hook, the outer ends of said brackets being secured to said chains.

6. An adjustable hanger comprising a member adapted to be suspended from a hook or the like, clamping means on said member, a screw having a nut or the like immovably mounted on the upper end thereof, said nut being clamped in said clamping means, a sleeve slidably mounted on said screw, and rotatable means partly on said sleeve and partly on said screw for moving said sleeve vertically on said screw, divergent brackets having their inner ends pivoted to said sleeve and having hooks on their outer ends, chains or the like suspended from said first-named hook, the outer ends of said brackets being secured to said chains.

7. An adjustable hanger according to claim 6, wherein said member comprises a U-bolt having downwardly projecting arms, and said clamping means comprises a pair of vertically spaced plates, said arms being threaded and having nuts thereon adapted to be tightened against said plates to lock said screw nut between said plates.

ORMIE A. PAUTZ.